United States Patent Office 3,525,410
Patented Aug. 25, 1970

3,525,410
METHOD OF AND APPARATUS FOR FORMING PREDETERMINED QUANTITIES OF MATERIAL FROM A CONTINUOUS FIBER FLEECE
Heinz Focke, Siemenstrasse, Verden (Aller), Germany
Filed July 18, 1968, Ser. No. 745,944
Claims priority, application Germany, July 20, 1967,
1,632,189
Int. Cl. G01g 13/08, 13/24; G01f 11/24
U.S. Cl. 177—122                             19 Claims

ABSTRACT OF THE DISCLOSURE

A method of forming individual batches or quantities of fibrous material such as cut tobacco from a continuously fed fiber fleece, comprising separating a portion of the material and weighing a first quantity of the batch in a rough manner so as to be of a weight below the desired final weight, and thereafter subsequently weighing the separated batch and simultaneously adding a desired weight of the material to the separated batch by an amount comparable to that of the deficiency of the rough weighed batch.

The apparatus for the method of the invention includes a first conveyor scale arranged to receive a batch of the fibrous material and to permit the weighing of the batch to achieve a rough evaluation of the desired quantity. The conveyor scale feeds, in turn, to a scale receptacle where the material is finally weighed while additional material is fed to the batch in accordance with the deficiency sensed by the scale of the first conveyor. The additional material is fed to the second scale by means of a dosage device comprising a rotatable wheel having suction means for picking up a quantity of the fibrous material and transferring it to a chute by the rotation of the wheel. The wheel is rotated by an amount equivalent to the desired increase of material to be transferred to the final weighing scale and the movement of the wheel is regulated by a control mechanism which is operated in accordance with the weight sensed by the weighing of the material.

SUMMARY OF THE INVENTION

This invention relates, in general, to devices for the separating and weighing of exact quantities of material and, in particular, to a new and useful method and device for forming individual quantities of fibrous material, particularly cut tobacco from a continuous fiber fleece by weighing a rough quantity of the material which is separated from the fleece and thereafter adding an additional quantity of material to the roughly weighed separated quantity to achieve an exact final amount.

Cut smoking tobacco is generally directed out of a cutting machine in the form of a continuous connected fleece in which the individual tobacco fibers are strongly intertwined with each other. In order to finally package the cut tobacco, the individual tobacco batches or quantities, for example, of a weight magnitude of about 50 grams, are required. These batches have to be separated from the tobacco fleece and have to be weighed. At the present time, it is known to loosen up the tobacco fleece by needle rollers and to tear up the fleece so that predetermined small quantities are separated and can be placed on the scale. Due to the loosening up and the tearing up of the tobacco fibers, a relatively large amount of short fiber tobacco is obtained which is called "crumb" tobacco. This crumb tobacco has to be utilized and this is normally done by adding it to the weighed amount of a tobacco batch.

It has been proposed to form individual batches of the tobacco by conveying the tobacco fleece to a scale while it is still secured to a constantly advanced or conveyed fleece. The fleece is fed until a sufficient quantity of material arrives on the scale to indicate the desired weight. Thereafter, this quantity or batch is separated from the fleece. The separation of the weighed batch from the fleece is effected by ripping or tearing tools which are relatively movable to each other and, are in the nature of combs.

In accordance with the present invention, a method and a device is provided for achieving a desirable formation of a tobacco batch of predetermined weight without the formation of significant amounts of short fiber tobacco and without diminishing the exactness of the formed individual batches. In accordance with the invention, the weight of the desired batch is determined by means of a first weighing procedure in which a batch of the tobacco is separated from the fleece up to an amount which is of a weight or volume which is generally slightly less than the desired weight or volume, but which is only roughly determined. Subsequently, a differential batch of tobacco is added to the separated batch in a quantity equal to the deficiency of weight of the separated and roughly weighed batch. By the method of obtaining first a rough weight of the separated material, it is possible to carry out the process in relatively short rhythm steps. An exact weighing of the batch to the desired final weight does not take place during the first separation and weighing, but can be done subsequently. When the batch is weighed subsequently, an amount of tobacco corresponding to the difference of the rough weight and the desired final weight is added. Since the initial rough weighing is carried out so that the weighed batch will always be less than the desired final amount, it is only necessary to control the amount of additional tobacco which is added during the final weighing.

The apparatus of the invention includes a first scale having a conveyor top for receiving the initially separated batch and for weighing this batch. A dosage device is associated with the scale for feeding additional tobacco to the roughly weighed batch after it is transferred to a second weighing scale. The dosage which is directed to the second weighing scale will be in accordance with the deficiency indicated by the first rough weighing scale.

Accordingly, it is an object of the invention to provide a method of separating a material from a continuous fleece of the material into individual quantities or batches of predetermined weight comprising initially feeding and separating the material onto a first scale in a quantity to achieve slightly less than the desired weight on the indication of the scale, thereafter adding a quantity of the fleece material to the separated material on the second scale until the deficiency of weight determined from the first scale is added.

A further object of the invention is to provide a device for accurately separating a predetermined weight of a material such as tobacco from a continuous fleece of the tobacco which comprises a first weighing scale onto which the material may be fed in a quantity less than the desired final weight and a second weighing scale arranged to receive the material from the first scale in association with a dosage device which is operated by pulses from the indication one of the weighing scales to feed an additional amount of the material to the second weighing scale in a quantity comparable to the deficiency indicated.

A further object of the invention is to provide a dosage device for feeding precise quantities of a material such as tobacco which includes a rotatable wheel element having a suction means for picking up a quantity of a tobacco in a continuous strip or groove formation on its periphery and which is rotatable to transfer the picked up quantity to a delivery member or chute, and including means associated with the wheel for discharging the picked up material at the end of its delivery movement, and means for controlling the amount of rotation of the wheel in accordance with the desired quantity of material to be dispensed.

A further object of the invention is to provide a device for separating a material such as tobacco into quantities of predetermined weight which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
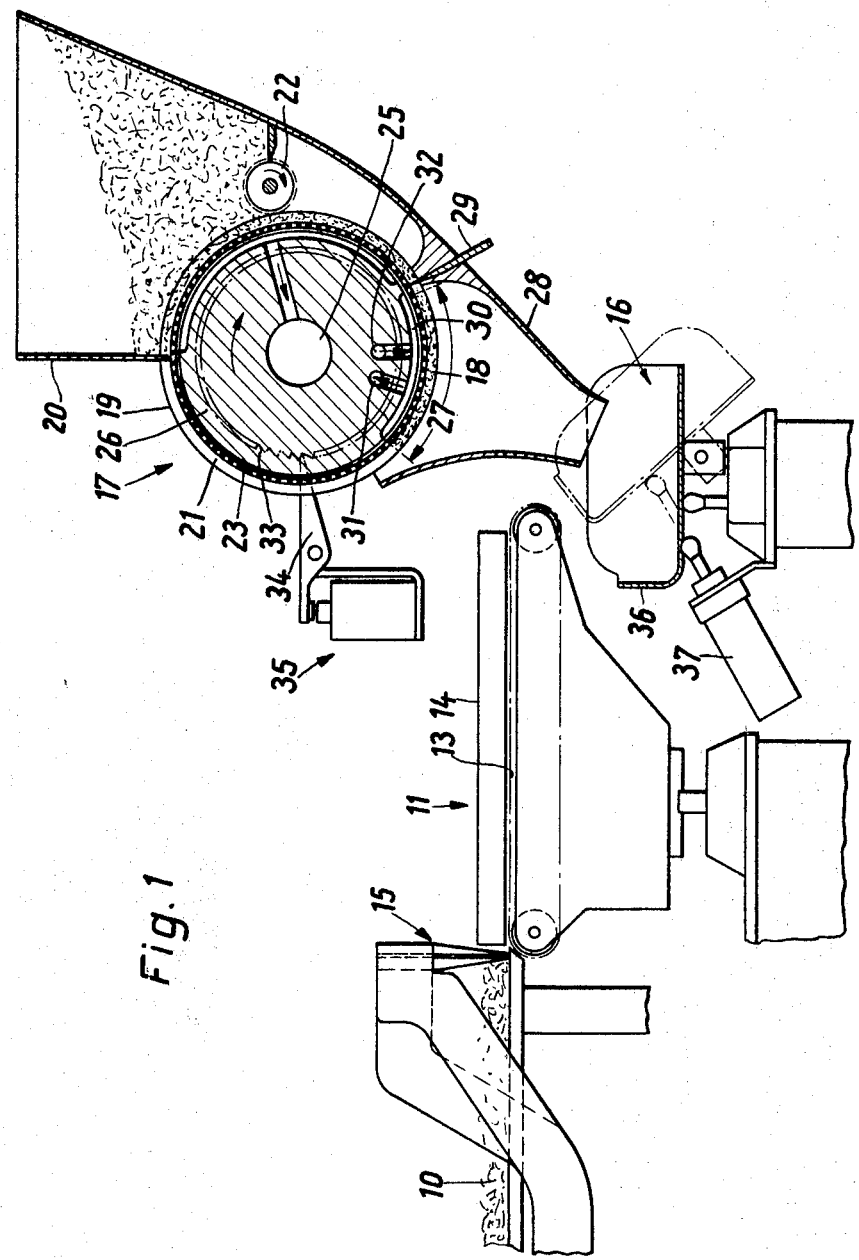
FIG. 1 is a schematic partially transverse sectional view of a device for separating precise quantities by weight of tobacco, constructed in accordance with the invention.
Figure 2:
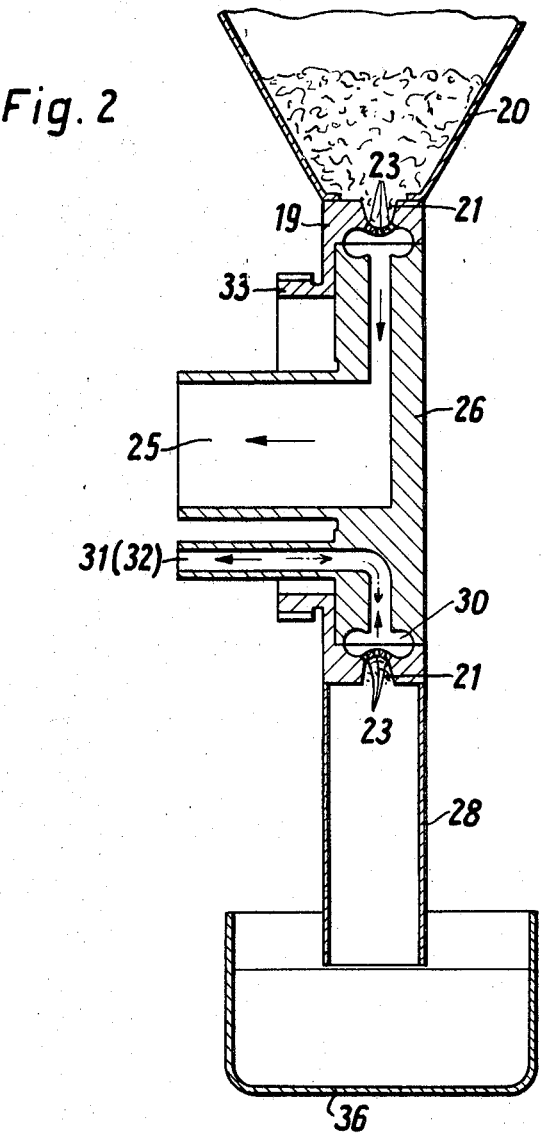
FIG. 2 is a vertical section taken on the line 2—2 of FIG. 1, but to a slightly larger scale than that of FIG. 1.

Referring to the drawings, in particular, the invention embodied therein comprises a device for the formation of individual batches which are determined in respect to quantity or weight from a fibrous material, in particular, from cut tobacco. A fleece of the fibrous material in the form of continuous interconnected fibers 10 is fed along a feed path which discharges onto an endless conveyor 13 of a first scale or rough weighing scale generally designated 11.

In accordance with the method of the invention, the formation of batches of predetermined weight is effected by weighing the separated tobacco in several subsequent steps or stages. In the embodiment shown, the batches are determined by two subsequent weighings. A first weighing is accomplished after the batch is separated from the fleece 10, and this is done by a separating device 15, which, for example, moves downwardly through the feed path of the fleece material 10 and separates this material from that which is already fed between boundary walls 14 on each side of the continuous conveyor 13. The separating device 15 is timed to operate such that the amount of material which arrives on the scale 11 will be less than the desired final batch weight which is to be obtained. This separated batch is roughly weighed on the scale 11 and it will be of a weight less than the desired final weight, so that during the subsequent second weighing, a certain amount of the missing quantity or differential quantity of tobacco must be added.

After the first weighing, on the scale 11, the material is delivered by the conveyor 13 into a receiving bin or hopper 36 of a second scale generally designated 16. The second scale 16 determines the missing or differential weight of the batch relative to the desired final weight and it controls the supply of a differential quantity of tobacco to the second scale by actuating a dosage device generally designated 17.

The scale 16 is connected through suitable controls (not shown) to the dosage device 17 which is actuated to dispense a quantity of additional tobacco into the bin 36 in the amount sufficient to achieve a desired final weight in the bin 36 before the latter is dumped by a dumping mechanism 37, which is effective to tilt the bin 36 to the dotted line position shown.

The dosage device is operated by the actuation of the scale 16 which determines the quantity of tobacco which is necessary to achieve the desired final weight and actuates the device 17 to deliver such a quantity onto the scale 16. For this purpose, the dosage mechanism 17 comprises a grooved wheel member which is rotatably mounted on a stationary hub 26 and is intermittently driven by a stepwise switching mechanism such as a solenoid 35 to pick up a quantity of tobacco from a hopper 20 and deliver it around on its periphery to a chute 28 for transfer eventually to the bin 36 of the scale 16. The wheel 19 includes an annular groove 21 which is moved into and through the hopper 20. The groove 21 communicates through air passages 23 to a suction source 25 so that the tobacco in the hopper 20, which is advantageously the tobacco of short fiber length, is picked up and retained in the groove 21 as the wheel 19 is rotated. With the suction applied to the groove, the wheel is rotated by an amount to transfer a continuous tobacco strip 18 in the groove 21 and this strip is uniform and homogeneous. The picked up material is advanced beyond a discharge opening of the chute 20 at which is located a comb wheel 22. The comb wheel 22 bears at the outer circumference of the profile wheel and rotates in a direction opposite to the movement of the wheel in order to strip off excess tobacco from the groove as it moves through the discharge opening of the chute hopper 20.

In accordance with the feature of the invention, the wheel 19 is rotated by an amount which will present a length of tobacco 18 to a dimension 27 sufficient to supply the amount of tobacco to the scale 16 which is necessary to achieve the predetermined weight which is desired. The control means or pulsing mechanism 35 for effecting the controlled rotation of the wheel 19 comprises a pivotal pawl or driving member 34 which engages in teeth 33 on a hub portion of the wheel 19 to advance the wheel by a number of pulse step movements to a position at which the desired dimensions 27 of tobacco strip length 18 is achieved. The pulsing mechanism 35 is connected to the scale 16 and is actuated in accordance with the weight indicated by the scale which is referenced to the amount which is required. For this purpose, a suitable electrical control extending between the scale indicator and the pulsing mechanism 35 (not shown) is provided. Such a device may advantageously comprise, for example, a digital output control device which is responsive to the indication on the scale 16 to provide a number of pulses to the control device 35 to rotate the wheel 19. Alternatively, a mechanical connection between the scale and the wheel 19 may be provided to provide a direct driving movement of the wheel in accordance with the amount of deflection of the scale bin 36 as reference to some predetermined desired weight.

The tobacco strip 18 is advantageously formed of short fibered tobacco. In this manner, an easy and exact separation of the predetermined length 27 of the strip 18 may be effected. In addition, it also provides an advantageous opportunity to utilize the short fibered tobacco, which for practical matters, is always formed. In some instances, it is desirable to provide means for casting off the sector 27 in the region of the funnel 28. Such means may comprise, for example, a separating knife 29 which may be directed through the tobacco strip 18. In addition, or alternatively, the wheel 19 is provided with an air groove 30 below the tobacco holding depression or groove 21 and a separate suction line 31 is connected to this groove 30. The suction line 31 generates in the region of the formed sector 27 the required vacuum conditions in the depression 21 to hold the material during the transportation of the strip 18. When the required tobacco amount corresponding to the length of the tobacco strip 18 is achieved, or when a corresponding rotation of the wheel 19 has been carried out, the wheel 19 is stopped and the sector 27 is cast off. The casting off of the sector 27 may be accomplished by merely discontinuing the vacuum in the depression or groove 21 so that the tobacco falls onto the scale 16. However, an additional means such as the use of compressed air may be directed through the pressure line 32 and the groove 30 to effect the stripping off of the strip 18.

The movement of the wheel 19 which is controlled by the scale 16 will be carried out each time the material is weighed on the scale 16 and the amount of rotation of the wheel will be in direct proportion to the amount of tobacco which is required in order to make up the desired final weight of the separated batch of material. The smaller the weight required, the smaller will be the movement of the wheel 19.

After the tobacco batch in the scale 16 is brought up to the desired final weight, the batch is either taken out or removed from the scale 16 and further processed. The dividing of the batch formation of tobacco by the several weighing steps in accordance with the invention has the advantage that the individual steps may be performed in shorter time periods so that the total formation of the batch may take place more rapidly. By the repeated weighing of the batch, a higher precision of the final weight is obtained.

What is claimed is:

1. A method of separating a fibrous material such as tobacco from continuous fleece into a batch of fibrous material of predetermined weight, comprising feeding the material from the continuous fleece onto a first weighing means and separating the fed material into a batch after a quantity roughly slightly below the desired final batch weight is obtained as determined by the first weighing means, and adding a subsequent differential quantity of material to the batch until the final desire weight is reached.

2. A method, according to claim 1, wherein said material is transferred to a second weighing means after the batch below the desired weight is formed on said first weighing means.

3. A method, according to claim 1, wherein said batch in a quantity roughly below the desired final batch weight is weighed at least one further time and additional material is supplied to the batch during each weighing until the amount of material corresponding to the weight necessary to bring it to the desired predetermined weight is added.

4. A method, according to claim 1, wherein the material is tobacco and a short fibered tobacco is added to bring the batch up to its desired final weight.

5. A method, according to claim 1, wherein additional material is added to the batch in accordance with an ascertained differential weight between the initial weight and the final desired weight by a volume-wise measurement.

6. An apparatus for separating fibrous material such as tobacco from a continuous fleece of the material into a batch of material of predetermined weight, comprising weighing means for receiving the material from a continuous fleece, means for separating the material from the continuous fleece after it is fed onto said weighing means and dosage means for supplying additional material to the separated batch in an amount in dependence upon the indicated weight of said batch.

7. A device, according to claim 6, wherein said weighing means includes a first scale arranged in a position to receive the material from the fleece and which is effective to weigh the material in a rough manner before it is separated by said separating means, and a second scale in a position to receive the material from the first scale, said dosage means being effective to supply an additional amount of material to said second scale in accordance with the indicated weight of said second scale.

8. A device, according to claim 6, wherein said dosage means includes a member for forming a continuous strip of the material and for conveying it to a position for adding to the batch of material.

9. A device, according to claim 6, wherein said dosage means comprises a container for the material, a wheel having a peripheral groove rotatable with its periphery extending through said container and means associated with said wheel for causing the material in said container to be retained in the groove of said wheel and transported with said wheel during rotation thereof.

10. A device, according to claim 8, wherein said means for holding the material in the groove of said wheel comprises suction means, and control means associated with said suction means for discontinuing suction to permit dropping off of the material from said wheel after said wheel is rotated to a position overlying the separated batch of material.

11. A device, according to claim 9, wherein said control means comprises fluid pressure and including means for separating a length of material transferred in the groove of said wheel.

12. A device, according to claim 8, including means adjacent said wheel for stripping the material from the surface thereof which is fed in the groove of said wheel.

13. A device, according to claim 8, including indexing means connected to said wheel for rotating said wheel by an amount in accordance with the weight of material which is to be supplied to said batch.

14. A device, according to claim 13, including electrical means for moving said wheel in a stepwise manner.

15. A dosing device for adding quantities of material to a separated batch of material such as tobacco in order to bring it up to a predetermined weight comprising a hopper for the material, a rotatable wheel having a peripheral groove rotatable with a portion thereof moving through said hopper and a portion thereof moving away from said hopper, means associated with said wheel for holding the material in said hopper into the groove of said wheel and to permit transporting of the material upon rotation of said wheel away from said hopper, and means for rotating said wheel by a predetermined amount in order to transfer a predetermined amount of material away from said hopper.

16. A device, according to claim 15, wherein said means for holding the material in the groove of said wheel comprises fluid pressure means.

17. A device, according to claim 15, wherein said fluid pressure means comprises a central suction supply communicating with said wheel, and passages extending from said central suction supply to the periphery of said wheel in communication with the peripheral groove thereof.

18. A device, according to claim 15, including a gear portion carried by said wheel and rachet means adjacent said wheel for engagement with the teeth thereof for rotating said wheel by a predetermined amount.

19. A device, according to claim 17, including electrical means associated with said rachet means for moving said rachet means to rotate said wheel.

References Cited

UNITED STATES PATENTS

| | | | |
|---|---|---|---|
| 2,183,606 | 12/1939 | Day | 221—211 XR |
| 2,324,667 | 7/1943 | Baker et al. | 177—114 |
| 3,193,029 | 7/1965 | Harvison et al. | 177—122 XR |
| 3,209,844 | 10/1965 | Stambera et al. | 177—64 |
| 3,387,746 | 6/1968 | Whipple | 221—211 |
| 3,404,742 | 10/1968 | Bonneric | 177—122 XR |
| 3,416,620 | 12/1968 | McClusky | 177—123 |

FOREIGN PATENTS

| | | |
|---|---|---|
| 334,107 | 8/1930 | Great Britain. |
| 632,626 | 11/1949 | Great Britain. |
| 654,056 | 6/1951 | Great Britain. |

ROBERT S. WARD, JR., Primary Examiner

U.S. Cl. X.R.

177—114; 222—414